July 18, 1939.                C. SAURER                 2,166,376
                          FLEXIBLE COUPLING
                         Filed March 4, 1937
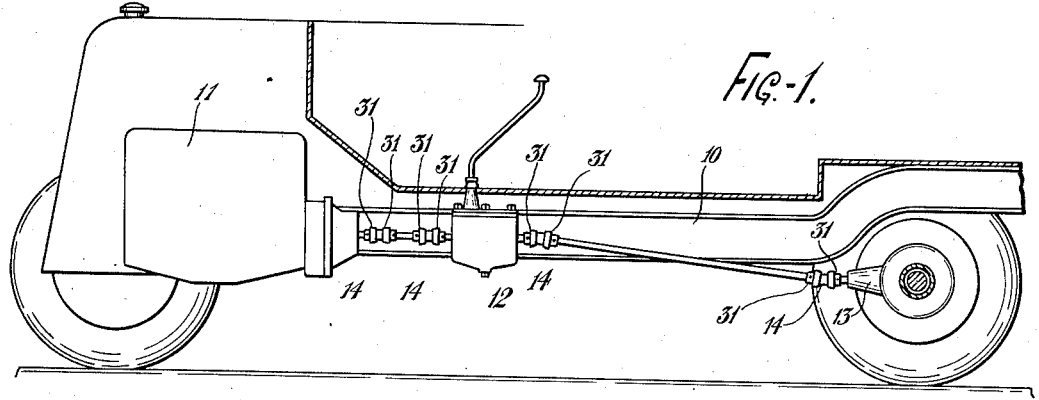
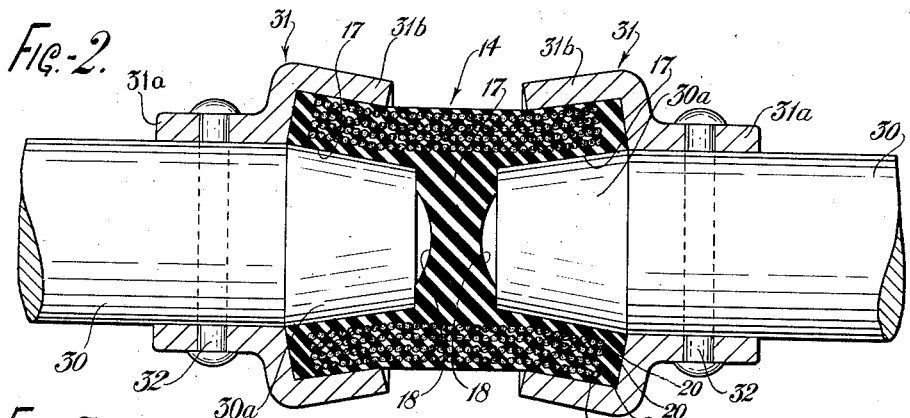
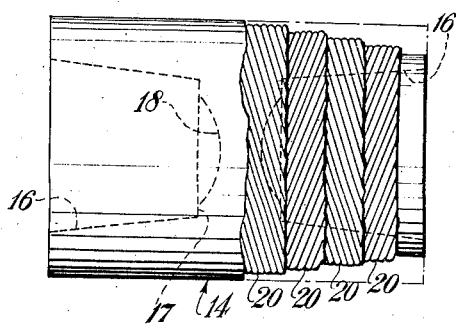
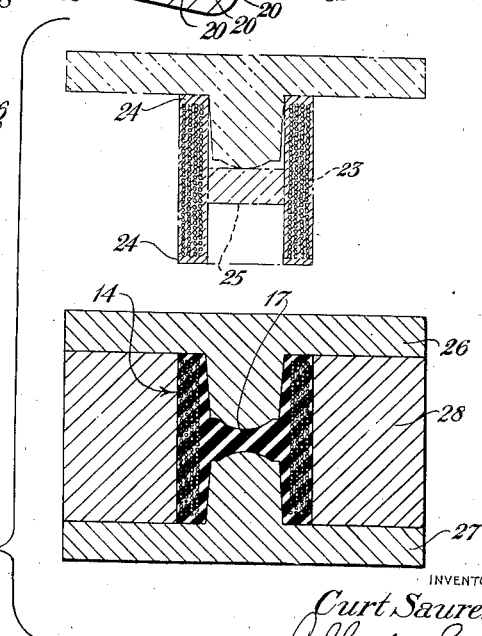
INVENTOR
Curt Saurer
BY Albert R. Ely
ATTORNEY Patented July 18, 1939

2,166,376

UNITED STATES PATENT OFFICE 2,166,376

FLEXIBLE COUPLING

Curt Saurer, Akron, Ohio, assignor to The Firestone Tire & Rubber Company, Akron, Ohio, a corporation of Ohio Application March 4, 1937, Serial No. 128,956

4 Claims. (Cl. 64—11)

This invention relates to flexible couplings, and more especially it relates to flexible couplings that include rubber as a means of obtaining flexibility therein.

The chief objects of the invention are to provide a coupling of the character mentioned that is simple in construction; and that will be rugged and durable, and have long life. More specifically, the invention aims to provide a reinforced rubber coupling in which the reinforcing elements are so arranged as to operate at maximum efficiency in sustaining torsional strain on the coupling; wherein said elements are not subjected to strain by the flexing of the coupling; and to provide a coupling that will not buckle or fold when flexed. Other objects will be manifest as the specification proceeds.

The invention is of primary utility in its adaptability for use in the transmission line of a motor vehicle, and is shown in such association in the illustrative embodiment of the invention depicted in the accompanying drawing, of which:

Figure 1 is a somewhat diagrammatic side elevation of a motor vehicle frame and power unit, and a plurality of the improved flexible couplings operatively mounted in the power-transmitting line thereof;

Figure 2 is a diametric section through one of the improved flexible couplings, as it appears when mounted in operative position upon the adjacent ends of a pair of shafts;

Figure 3 is a side elevation of the coupling, a part thereof being broken away to reveal the internal reinforcing structure; and Figure 4 is a vertical section through a mold, and the coupling therein, showing how the latter is shaped during the manufacture thereof.

Referring now to Figure 1 of the drawing, there is shown a vehicle frame 10 carrying the usual power unit comprising an engine or motor 11, a transmission box or housing 12, and a differential casing 13. As shown, there are two flexible couplings, generally designated 14, in the driving connection between the motor 11 and the gearing in the transmission box 12, and two similar couplings 14 in the driving connection between the transmission box and the differential housed in the casing 13.

Each coupling member 14 is a cylindrical structure of rubber composition having a reinforcement of strands of cable cords therein. The coupling is formed with two axially disposed sockets 16, 16 that are frusto-conical in shape and extend inwardly from the opposite ends of the structure, the inner ends of said sockets being separated by a partition or wall 17 of rubber disposed midway between the ends of the structure. The respective lateral faces of the wall 17 are formed with centrally arranged concavities 18, the latter permitting displacement of the rubber of the wall 17 upon flexure of the coupling.

The reinforcement of the rubber structure consists of a plurality of concentric, superposed layers 20, 20 of strands of cable cords, the layers being shown herein as four in number, although a greater or lesser number may be provided if desired. As is most clearly shown in Figure 3, each reinforcing layer 20 comprises a group of cord strands that extend helically about the axis of the structure in laterally abutting convolutions. The cords are disposed at a wide angle with relation to the axis of the coupling so that they lie substantially parallel to the direction of torsional strains to which the coupling is subjected in use, with the result that they will operate at maximum efficiency in sustaining said strains. The arrangement also is advantageous for the reason that adjacent convolutions of the strands easily may move laterally or separate from each other upon transverse flexure of the coupling, so that such flexure will impose little or no added strain upon the strands. The angle of the reinforcing strands with relation to the axis of the coupling is reversed in adjacent layers 20 so that the strands of one layer intersect or cross the strands of an adjacent layer or layers, thereby providing a balanced structure that will resist torque equally well in either direction. There is a thin layer of rubber between each reinforcing layer 20.

Manufacture of the improved coupling may be economically effected by constructing long length tubes of unvulcanized rubber, and cord strands arranged as described, and thereafter severing said tubes transversely into shorter lengths suitable for individual couplings, such as the structure shown in broken lines at 23, Figure 4. Thereafter, annular pieces 24, 24 of unvulcanized rubber are adhered to the respective ends of the structure 23 to cover the exposed ends of the reinforcing cords, and a short, cylindrical block of unvulcanized rubber 25 inserted into the interior thereof. The assembled structure is then mounted in a mold, such as the three piece mold comprising top and bottom plates 26 and 27 respectively and intermediate member 28, and vulcanized by heat and pressure in the usual manner. Vulcanization effects the coalescing of the rubber portions of the coupling to produce a unitary structure 14.

Referring to Figure 2, it will be seen that the coupling 14 is designed to engage the adjacent ends of a pair of shafts 30, 30, the end portions of said shafts being somewhat tapered or frusto-conical in shape as shown at 30a, so as to be received in the sockets 16 of the coupling. The shaft-ends 30a are of somewhat steeper taper than the sockets 16 and have greater maximum diameter than the maximum diameter of said sockets, with the result that the end portions of the coupling will be somewhat radially distended when the shaft-ends are forced into said sockets. The coupling 14 is retained in operative engagement with the shafts 30 by means of clamping sleeves 31, 31 that are fixedly secured to the respective shafts and frictionally engage the respective end portions of the coupling 14, on the outer periphery thereof. Each clamping sleeve 31 comprises an annular portion 31a adapted to fit over a shaft 30, rearwardly of the tapered end portion 30a thereof, and a larger, annular, portion 31b adapted to fit over an end portion of the coupling 14, said portion 31b being tapered at the same angle as the end-portion 30a of shaft 30 so as to be parallel to said portion 30a throughout its axial extent. Each clamping sleeve 31 is secured to its shaft 30 by means of suitable fastening means, such as a rivet or pin 32 that extends through portion 31a thereof and through shaft 30 on which it is mounted.

In connecting the ends of shafts 30 by means of the coupling 14, the clamping sleeves 31 are first mounted upon the end portions of the coupling member 14, and then the shafts are inserted into portions 31a of said couplings and forced therethrough and into the sockets 16 of the coupling. This distends the end portions of the coupling so that they are flared radially outwardly into strong frictional engagement with the inner face of the tapered portions 31b of clamping sleeves 31. When the shaft-ends 30a are fully seated in the coupling 14, their end faces abut the central partition or wall 17 thereof, and said tapered portions have strong frictional engagement with the coupling so as to prevent relative movement therebetween. After the shafts and coupling have been assembled as described, the fastening means are applied to unite the shafts 30 and the sleeves 31.

The improved coupling is of simple construction, may be manufactured at low cost, and achieves the other objects set out in the foregoing statement of objects.

Modification may be resorted to without departing from the spirit of the invention or the scope of the appended claims.

What is claimed is:

1. A flexible coupling comprising a generally cylindrical rubber structure formed with respective co-axially disposed, shaft-receiving sockets in the opposite ends thereof, and reinforcement of cord strands within said rubber structure, said strands being arranged helically about the axis of the structure in adjacent convolutions that are disposed at a relatively wide angle with relation to the axis of the coupling, and substantially parallel to the direction of torsional strains imposed thereon.

2. A flexible coupling comprising a generally cylindrical rubber structure formed with respective co-axially disposed shaft-receiving sockets in the opposite ends thereof, and reinforcement in said structure consisting of a plurality of superposed layers of cord strands, which strands are arranged concentrically about the axis of the structure and sockets thereof in adjacent helical convolutions that extend substantially parallel to the direction of torsional strains to which the structure is subject, and which lie at a relatively wide angle with relation to the axis of the structure, said angle being reversed in adjacent layers so that the strands of one layer cross the strands of an adjacent layer.

3. The combination which comprises a pair of shafts having frusto-conical end portions disposed adjacent each other, a coupling of reinforced rubber between said shaft-ends, said coupling being formed in its ends with sockets of smaller size than said shaft-ends for receiving the latter whereby the end portions of the coupling are distended, and clamping members frictionally engaging the respective distended portions of the coupling on the outer periphery thereof, and secured to the respective shafts beyond the respective ends of the coupling.

4. The combination which comprises a pair of shafts having tapered, frusto-conical end portions disposed adjacent each other, a coupling of reinforced rubber between said shaft-ends and formed in each end with a frusto-conical socket of smaller size than the shaft-ends for receiving the latter, whereby the end portions of the coupling are radially distended, and a clamping member secured to each shaft beyond the end of the coupling and having a frusto-conical portion circumscribing the distended end portion of the coupling and frictionally engaging the same, and having a substantially radially disposed portion abutting the end of the coupling.

CURT SAURER.